US008750109B2

(12) United States Patent
Gerber et al.

(10) Patent No.: US 8,750,109 B2
(45) Date of Patent: *Jun. 10, 2014

(54) INFERRING TCP INITIAL CONGESTION WINDOW

(75) Inventors: Alexandre Gerber, Madison, NJ (US); Zhuoqing Mao, Ann Arbor, MI (US); Feng Qian, Ann Arbor, MI (US); Subhabrata Sen, N. Providence, NJ (US); Oliver Spatscheck, Randolph, NJ (US); Walter Willinger, Madison, NJ (US)

(73) Assignees: AT&T Intellectual Property I, L.P., Atlanta, GA (US); The Regents of the University of Michigan, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,645

(22) Filed: Aug. 17, 2012

(65) Prior Publication Data

US 2012/0307678 A1    Dec. 6, 2012

Related U.S. Application Data

(63) Continuation of application No. 12/607,240, filed on Oct. 28, 2009, now Pat. No. 8,274,886.

(51) Int. Cl.
*H04L 12/56* (2011.01)
(52) U.S. Cl.
USPC ......................................... 370/230; 370/235

(58) Field of Classification Search
None
See application file for complete search history.

(56) References Cited

U.S. PATENT DOCUMENTS

| 6,493,316 | B1 * | 12/2002 | Chapman et al. | 370/231 |
|---|---|---|---|---|
| 7,304,948 | B1 * | 12/2007 | Ong | 370/230.1 |
| 7,397,759 | B2 * | 7/2008 | Tan et al. | 370/216 |
| 7,532,642 | B1 * | 5/2009 | Peacock | 370/468 |
| 8,274,886 | B2 * | 9/2012 | Gerber et al. | 370/230 |
| 2002/0085587 | A1 * | 7/2002 | Mascolo | 370/477 |
| 2007/0223529 | A1 * | 9/2007 | Lee et al. | 370/468 |
| 2008/0183888 | A1 * | 7/2008 | Brown et al. | 709/235 |

OTHER PUBLICATIONS

U.S. Notice of Allowance dated May 31, 2012 in U.S. Appl. No. 12/607,240.

* cited by examiner

*Primary Examiner* — Brian D Nguyen
*Assistant Examiner* — Roberta A Shand
(74) *Attorney, Agent, or Firm* — Hartman & Citrin LLC

(57) ABSTRACT

A packet trace is received. Inter-arrival times between the multiple packets in the packet trace are determined. An inter-arrival time in the inter-arrival times that is greater than a threshold is identified. An order number of the inter-arrival time is identified. A determination is made as to whether a size of each of at least a portion of the multiple packets is equal to a maximum segment size. When a determination is made that the size of each of at least a portion of the multiple packets is equal to the maximum segment size, a size of the ICW as a product of the order number and the maximum segment size is returned.

20 Claims, 3 Drawing Sheets

200

1: $c \leftarrow null$; Calculate inter-arrival time $I_2, \ldots, I_k$
2: for $j = 2$ to $k$ do
3:    if $I_j / \sum_{i=2}^{k} I_i > \theta$ then $c \leftarrow j-1$; exit for; endif
4: end for
5: if $c = null$ then $c \leftarrow \arg\max_{2 \leq j \leq k}\{I_j\} - 1$; endif
6: if first $c-1$ packets have the same packet size $MSS$ then
7:    return $c \times MSS$; else return unknown ICW; endif

*Fig. 2*

INFERRING TCP INITIAL CONGESTION WINDOW

CROSS-REFERENCE TO RELATED APPLICATIONS

This patent application is a continuation of and claims priority to U.S. patent application Ser. No. 12/607,240, now U.S. Pat. No. 8,274,886 entitled "Inferring TCP Initial Congestion Window," filed Oct. 28, 2009, which is herein incorporated by reference in its entirety.

BACKGROUND

This application relates generally to the field of computer networks. More specifically, the disclosure provided herein relates to passively inferring a Transmission Control Protocol ("TCP") initial congestion window ("ICW").

Modern Internet Protocol ("IP") networks carry traffic from a diverse set of applications, ranging from non-real-time applications to real-time applications. Generally, real-time applications are those applications that meet a real-time constraint, i.e., a time limit in which a system responds to a request or event. Examples of non-real-time applications include email and bulk data transfers (e.g., File Transfer Protocol ("FTP") file transfers). Examples of real-time applications include Voice over IP ("VoIP"), Internet Protocol Television ("IPTV"), Internet games, and critical business transactions.

Historically, non-real-time applications dominated the Internet landscape. However, in recent years, real-time applications have become increasingly popular. A number of factors have contributed to this material shift from non-real-time applications to real-time applications. These factors include the rapid deployment of backbone links with one to two orders of magnitude more network capacity, the increasing reach of broadband access networks, the emergence of bandwidth-intensive streaming applications, and an economic and technological move towards transitioning even mission-critical applications from dedicated networks to the Internet through architectures like Virtual Private Networks ("VPNs").

While the applications, as well as the constraints upon which the applications operate, have multiplied, TCP has remained the dominant transport layer protocol in IP networks. In particular, TCP is widely adopted by many new applications and accounts for the majority of current traffic on the Internet. However, TCP was originally designed to support a reliable, in-order delivery of a byte stream between two endpoints in a bandwidth friendly manner. In this regard, TCP is not an ideal transport protocol for real-time applications.

A number of considerations have contributed to the dominance of TCP in IP networks. These considerations include the following: (1) TCP is deployed nearly ubiquitously; (2) TCP helps offload many low-level transport details with which an application developer would otherwise have to contend; and (3) TCP packets are routinely allowed by firewalls, which typically block non-TCP data flows. Further, fueled by the need to support more stringent performance requirements of emerging applications, developers have created various TCP variants, such as FAST, HSTCP, and CUBIC. Some vendors have also promoted acceleration hardware that offers propriety optimizations to TCP.

While TCP continues to dominate IP networks, little is known or studied about the behavior of TCP traffic on the Internet. Understanding the behavior of TCP may be vital for proper management, provisioning, and capacity planning of IP networks. Further, understanding the behavior of TCP may provide insights to guide network protocol design.

SUMMARY

Embodiments of the disclosure presented herein include methods, systems, and computer-readable media for inferring an ICW. According to one aspect, a method for inferring the ICW is provided. According to the method, a packet trace is received. Inter-arrival times between the multiple packets in the packet trace are determined. An inter-arrival time in the inter-arrival times that is greater than a threshold is identified. An order number of the inter-arrival time is identified. A determination is made as to whether a size of each of at least a portion of the multiple packets is equal to a maximum segment size. When a determination is made that the size of each of at least a portion of the multiple packets is equal to the maximum segment size, a size of the ICW as a product of the order number and the maximum segment size is returned.

According to another aspect, a system for inferring the ICW is provided. The system includes a memory and a processor functionally coupled to the memory. The memory stores a program containing code for inferring the ICW. The processor is responsive to computer-executable instructions contained in the program and configured to perform the following operations. A packet trace is received. Inter-arrival times between the multiple packets in the packet trace are determined. An inter-arrival time in the inter-arrival times that is greater than a threshold is identified. An order number of the inter-arrival time is identified. A determination is made as to whether a size of each of at least a portion of the multiple packets is equal to a maximum segment size. When a determination is made that the size of each of at least a portion of the multiple packets is equal to the maximum segment size, a size of the ICW as a product of the order number and the maximum segment size is returned.

According to yet another aspect, a computer-readable medium having instructions stored thereon for execution by a processor to perform a method for inferring the ICW is provided. According to the method, a packet trace is received. Inter-arrival times between the multiple packets in the packet trace are determined. An inter-arrival time in the inter-arrival times that is greater than a threshold is identified. An order number of the inter-arrival time is identified. A determination is made as to whether a size of each of at least a portion of the multiple packets is equal to a maximum segment size. When a determination is made that the size of each of at least a portion of the multiple packets is equal to the maximum segment size, a size of the ICW as a product of the order number and the maximum segment size is returned.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 is a diagram illustrating exemplary pseudo-code configured to implement an exemplary method for inferring the ICW, in accordance with some embodiments.

DETAILED DESCRIPTION

Figure 1:
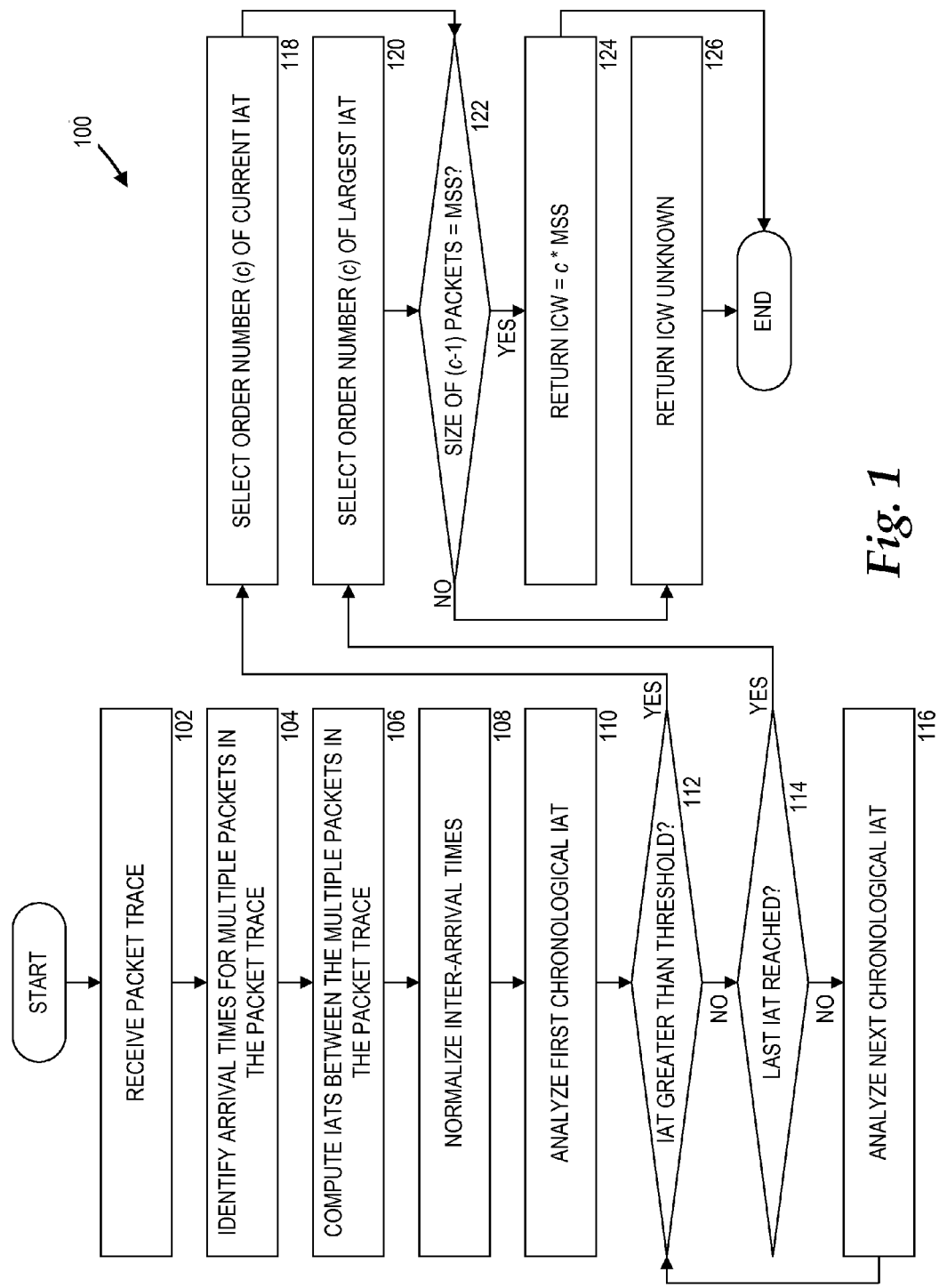
FIG. 1 is a flow diagram illustrating an exemplary method for inferring an ICW, in accordance with some embodiments.

The following detailed description is directed to methods, systems, and computer-readable media for passively inferring an initial congestion window size. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. As used herein, the transmission of data packets over TCP may be referred to as TCP flow. Prior to a TCP flow, a TCP sender may establish a connection with a TCP receiver. A TCP sender typically establishes a connection with a TCP receiver by way of a three-way handshake. In summary, the three-way handshake operates as follows: (1) the TCP sender sends SYN to the TCP receiver; (2) the TCP receiver replies with SYN/ACK to the TCP sender; and (3) the TCP sender sends ACK back to the TCP receiver. The three-way handshake is well known to those skilled in the art, and as such, will not be described in further detail herein.

The three-way handshake may synchronize sequence numbers for communications between the TCP sender and the TCP receiver. A sequence number may refer to a 32-bit field in the TCP header that identifies each byte of data in a data segment. The sequence number may identify the order of the bytes sent from each computer so that the data can be reconstructed in order, regardless of any fragmentation, disordering, or packet loss that may occur during transmission.

When the TCP sender transmits a data segment to the TCP receiver, the TCP header may include a particular sequence number. In an exemplary implementation, the first byte of the data may be assigned this sequence number. The sequence number may then be incremented for each subsequent byte of the data following the first byte. Thus, for example, if a data segment includes four bytes of data and a sequence number 1000, then the first byte of data may be assigned the sequence number 1000, the second byte of data may be assigned a sequence number 1001, the third byte of data may be assigned a sequence number 1002, and the fourth byte of data may be assigned a sequence number 1003.

Upon receiving the data segment from the TCP sender, the TCP receiver may transmit an acknowledgment (also referred to as an "ACK") verifying the data transmission back to the TCP sender. In an exemplary implementation, the acknowledgment may specify the sequence number of the next byte that the TCP receiver expects to receive. In this way, the acknowledgment may indicate whether the data transmission was successful. In the previous example where the data segment includes four bytes of data and the sequence number 1000, if the data transmission is successful, then the acknowledgment transmitted from the TCP receiver back to the TCP sender will specify the sequence number of the next byte that the TCP receiver expects to receive is sequence number 1004, which follows the fourth byte of data having the sequence number 1003. However, if the acknowledgment transmitted from the TCP receiver back to the TCP sender specifies, for example, the sequence number 1002, then the TCP sender can infer that the data transmission was unsuccessful.

With regards to TCP, a congestion window generally refers to the maximum amount of data (i.e., the number of bytes) that the TCP sender can send to the TCP receiver prior to the TCP sender receiving any ACKs from the TCP receiver. In an exemplary implementation of the congestion window, when the TCP sender sends X amount of data, the congestion window may be reduced by this X amount of data. Once the congestion window reaches a zero value, no more data can be transmitted. When the TCP receiver responds with an ACK verifying that Y amount of data has been received (through the use of sequence numbers, as previously described), the congestion window may be increased by this Y amount of data. In this way, TCP can manage the rate of data transmission between the TCP sender and the TCP receiver in order to ensure reliable data transmissions.

As used herein, an initial congestion window ("ICW") refers to the congestion window after a connection has been established between a TCP sender and a TCP receiver by way of the three-way handshake, but prior to any acknowledgements being received by the TCP sender from the TCP receiver. Embodiments are provided herein for inferring the size of the ICW by analyzing a unidirectional TCP flow trace. A relatively large ICW may enable aggressive TCP flows where large bursts of data are transmitted at the beginning of a TCP connection without any throttling. These large bursts of data may cause data loss, data transmission delays, and other network performance issues.

When the TCP sender transmits data packets to the TCP receiver, a TCP packet monitor placed between the TCP sender and the TCP receiver may record a timestamp for each data packet within a packet trace. Embodiments provided herein for inferring the size of the ICW compute the "gaps" between each of the timestamps. These "gaps" between each of the timestamps are referred to herein as inter-arrival times (also referred to as "IATs"). Beginning with the earliest inter-arrival time, consecutive inter-arrival times are then compared against a threshold. The first inter-arrival time that is larger than the threshold may indicate that the TCP sender has reached the ICW and is awaiting ACKs from the TCP receiver. The size of the ICW may be determined based on the order number of the first inter-arrival time, as described in greater detail below.

Conventional approaches for estimating the size of the ICW involve active probing techniques. In contrast to those conventional approaches, the embodiments described here utilize a passive measurement scheme whereby the size of the ICW is estimated by analyzing the inter-arrival times for the first few packets at the beginning of a unidirectional data flow. Through the embodiments described herein, a user can identify ICWs that are larger than min(4×MSS,max(2×MSS, 4380)), which is the upper size as mandated in the Request for Comments ("RFC") TCP specification. As is known to those skilled in the art, the MSS refers to the maximum segment size, which is the maximum amount of data that can be transmitted per segment to avoid fragmentation of data packets.

Referring now to the drawings, in which like numerals represent like elements through the several figures, FIG. 1 is a flow diagram illustrating an exemplary method 100 for inferring the size of the ICW, according to some embodiments. The method 100 begins at operation 102, where a packet trace is received. The packet trace may be recorded by a packet monitor configured at some point between a TCP sender and a TCP receiver. The packet trace may include arrival times for data packets transmitted between the TCP sender and the TCP receiver. In one embodiment, the packet trace starts with a SYN-ACK packet. In one embodiment, the packet trace includes no retransmissions in a given number of packets. The packet trace may be a unidirectional or a bi-directional packet trace. When the packet trace is received, the method 100 proceeds to operation 104.

At operation 104, arrival times for each of the multiple packets are identified through the packet trace. These arrival times may be specified by timestamps in the packet trace. The method 100 then proceeds to operation 106, where the inter-arrival times between arrival times for the multiple packets are computed. In some embodiments, one or more of the identified inter-arrival times may be discarded. For example, an inter-arrival time may be discarded if the inter-arrival time includes extra delay caused by the operating system of the TCP sender. When the inter-arrival times between the multiple packets are computed, the method 100 proceeds to operation 108.

At operation 108, the inter-arrival times are normalized. The computed inter-arrival times may be absolute values (e.g., in milliseconds ("ms")). However, it may be difficult to apply an absolute threshold because different types of networks may have significantly different inter-arrival times (e.g., 20 ms vs. 200 ms). Therefore, the inter-arrival times may be "normalized" by converting absolute inter-arrival times to relative inter-arrival times. The method 100 then proceeds to operation 110, where a first chronological inter-arrival time is selected as a current inter-arrival time to be analyzed. The first chronological inter-arrival time refers to the "gap" between the arrival times of the first two packets of the multiple packets. When the first chronological inter-arrival time is selected to be analyzed, the method 100 proceeds to operation 112.

At operation 112, a determination is made as to whether the current inter-arrival time is greater than a threshold. If a determination is made that the current inter-arrival time is not greater than the threshold, then the method 100 proceeds to operation 114. At operation 114, a determination is made as to whether the current inter-arrival time is the last inter-arrival time to be analyzed from the computed inter-arrival times. If the current inter-arrival time is not the last inter-arrival time to be analyzed, then the method 100 proceeds to operation 116, where the next chronological inter-arrival time after the current inter-arrival time is selected as the current inter-arrival time to be analyzed. The method 100 then proceeds back to the operation 112. The operations 112, 114, and 116 may be repeated until the current inter-arrival time is greater than the threshold at operation 112 or until the last inter-arrival time has been reached at operation 114.

Referring again to operation 112, if the current inter-arrival time is greater than the threshold, then the method 100 proceeds to operation 118, where an order number (shown in FIG. 1 as the variable "c") of the current inter-arrival time is selected. For example, if three inter-arrival times are determined and the first inter-arrival time is greater than the threshold, then the order number is one. If the first inter-arrival time is not greater than the threshold but the second inter-arrival time is greater than the threshold, then the order number is two. If the first inter-arrival time and the second inter-arrival time are not greater than the threshold but the third inter-arrival time is greater than the threshold, then the order number is three. When the order number is selected at operation 118, the method 100 proceeds to operation 122.

Referring again to operation 114, if the last inter-arrival time has been reached, then the method 100 proceeds to operation 120, where the order number of the largest inter-arrival time is selected. For example, if three inter-arrival times are determined and the first inter-arrival time is larger than the second inter-arrival time and the third inter-arrival time, then the order number is one. If the second inter-arrival time is larger than the first inter-arrival time and the third inter-arrival time, then the order number is two. If the third inter-arrival time is larger than the first inter-arrival time and the second inter-arrival time, then the order number is three. When the order number is selected at operation 120, the method 100 proceeds to operation 122.

At operation 122, a determination is made as to whether the size of each of a number of the data packets equals the MSS. The number of data packets may be in chronological order beginning with the earliest data packet. In one embodiment, the number is the order number minus one (shown in FIG. 1 as c−1). At operation 124, if a determination is made that the size of each of the number of the data packets equals the MSS, then the ICW is returned as the product of the order number and the MSS (shown in FIG. 1 as c*MSS). At operation 126, if a determination is made that the size of one or more of the number of the data packets does not equal the MSS, then a message indicating that the ICW is unknown or cannot be determined is returned.

FIG. 2 is a diagram illustrating an exemplary pseudo-code 200 implementing the method 100 for inferring the size of the ICW. The pseudo-code 200 includes a first line 202, a second line 204, a third line 206, a fourth line 208, a fifth line 210, a sixth line 212, and a seventh line 214. In the first line 202, an order number c is initialized to null. Then, inter-arrival times I are calculated for the first k+1 data packets in a packet trace. In one embodiment, there are no retransmissions in the first k+1 data packets in a packet trace. The inter-arrival times I may be represented as $I_1, \ldots I_k$. However, in the pseudo-code 200 of FIG. 2, the first inter-arrival time $I_1$ is discarded because the first inter-arrival time $I_1$ includes extra delay caused by the operating system of the TCP sender. As such, the available inter-arrival times I are represented as $I_2, \ldots I_k$. The first line 202 of the pseudo-code 200 may correspond to operation 106 of the method 100.

The second line 204, the third line 206, and the fourth line 208 introduce a for-loop whereby the inter-arrival times I are chronologically compared to a threshold θ. In particular, the for-loop introduces a temporary variable j ranging in value from 2 to k, which corresponds to each of the inter-arrival times $I_2, \ldots I_k$. When an inter-arrival time I is reached that is greater than the threshold θ, the value of j minus one is stored in the order number c (i.e., c←j−1). The value of j minus one corresponds to the order number of the inter-arrival time I that is greater than the threshold θ. The second line 204, the third line 206, and the fourth line 208 of the pseudo-code 200 may correspond to operations 112, 116, and 118 of the method 100.

The fifth line 210 introduces an if-statement determining whether the order number c is equal to null. As previously described, the order number c was initialized to null. Thus, if the order number c is still equal null, then none of the inter-arrival times $I_2, \ldots I_k$ are greater than the threshold θ. If the order number c is still equal null, then the order number of the largest inter-arrival time I from the arrival times $I_2, \ldots I_k$ is stored in the order number c. The fifth line 210 may correspond to operations 114 and 116 of the method 100.

The sixth line 212 and the seventh line 214 introduce an if-statement determining whether each of the first c−1 data packets has the same packet size as the maximum segment size MSS. If each of the first c−1 data packets has the same packet size as the maximum segment size MSS, then the ICW is returned as the product of the order number c and the maximum segment size MSS (i.e., c×MSS). If one or more of the first c−1 data packets does not have the same packet size as the maximum segment size MSS, then a message indicating that the ICW is unknown is returned.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 3:
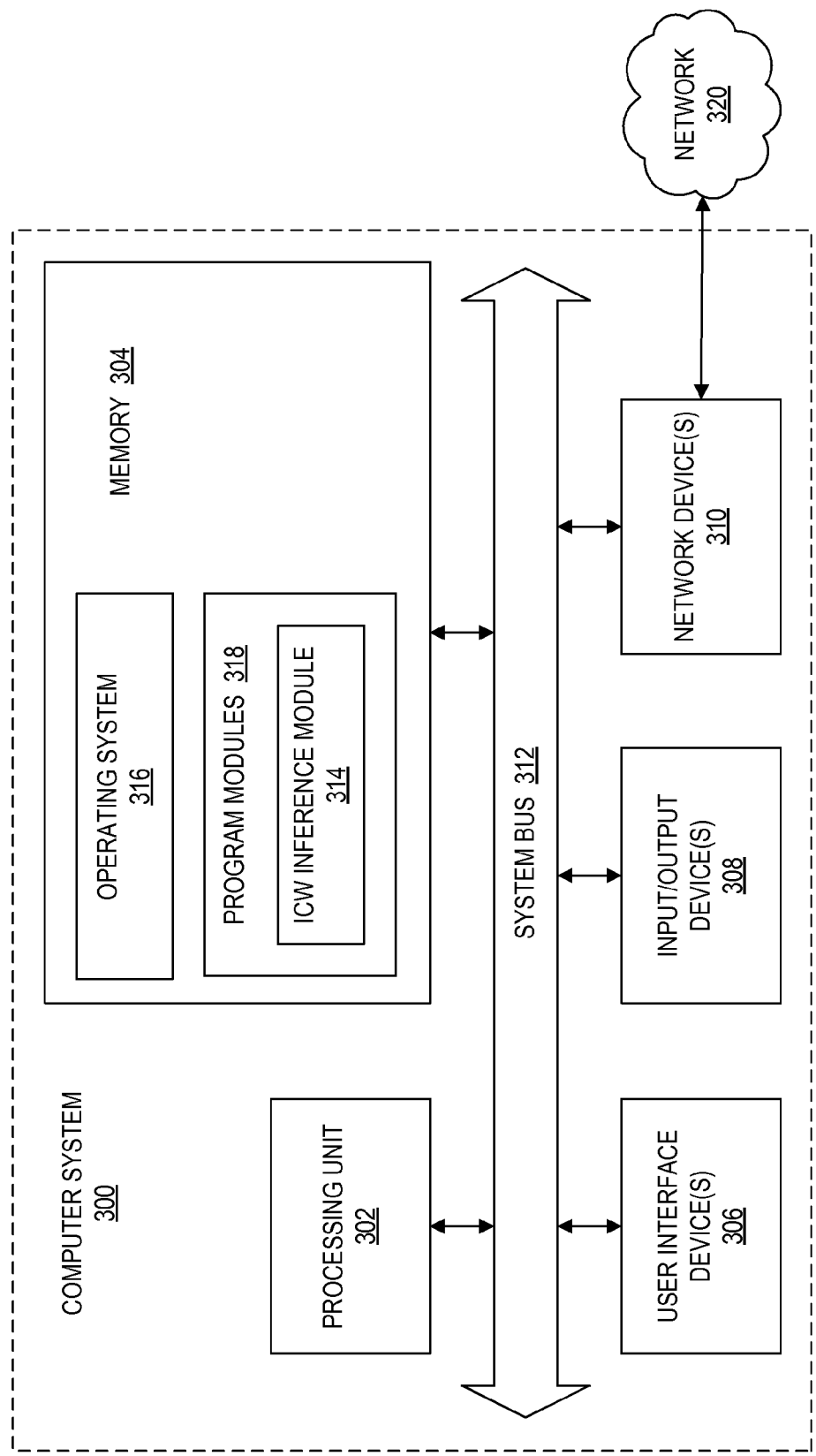
FIG. 3 is a block diagram illustrating an exemplary computer system configured to infer the ICW, in accordance with some embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to infer an ICW, in accordance with embodiments. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 318 include an ICW inference module 314. In some embodiments, the ICW inference module 314 is embodied in computer-readable media containing instructions that, when executed by the processing unit 302, performs the method 100 and/or the pseudo-code 200 for inferring an ICW, as described in greater detail above with respect to FIGS. 1 and 2. According to embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via the network 320. Examples of the network devices 310 may include, but are not limited to, a modem, a radio frequency ("RF") or infrared ("IR") transceiver, a telephonic interface, a bridge, a router, or a network card. The network 320 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 320 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for inferring an initial congestion window, the method comprising:
   receiving a packet trace, the packet trace comprising arrival times for multiple packets;
   determining inter-arrival times between the multiple packets based on the arrival times;
   identifying an inter-arrival time in the inter-arrival times that is greater than a threshold;
   identifying an order number of the inter-arrival time;
   determining, by a computer, whether a size of each of at least a portion of the multiple packets is equal to a maximum segment size; and
   responsive to determining that the size of each of at least a portion of the multiple packets is equal to the maximum segment size, returning a size of the initial congestion window as a product of the order number and the maximum segment size.

2. The method of claim 1, wherein the packet trace comprises a unidirectional packet trace.

3. The method of claim 1, wherein determining the inter-arrival times between multiple packets in the packet trace comprises discarding a first chronological inter-arrival time from the multiple packets.

4. The method of claim 1, wherein identifying the inter-arrival time in the inter-arrival times that is greater than the threshold comprises:
   (a) selecting a first chronological inter-arrival time in the inter-arrival times as a current inter-arrival time;
   (b) determining whether the current inter-arrival time is greater than the threshold;
   (c) responsive to determining that the current inter-arrival time is greater than the threshold, identifying the inter-arrival time as the current inter-arrival time;
   (d) responsive to determining that the current inter-arrival time is not greater than the threshold, determining whether a last inter-arrival time in the inter-arrival times has been reached; and
   (e) responsive to determining that the last inter-arrival time has not been reached, incrementing the current inter-arrival time, and repeating (b)-(e) until a determination is made that the current inter-arrival time is greater than the threshold or until the last inter-arrival time has been reached.

5. The method of claim 4, wherein identifying the inter-arrival time in the inter-arrival times that is greater than the threshold further comprises:
   (f) responsive to determining that the last inter-arrival time has been reached, identifying the inter-arrival time as a largest inter-arrival time in the inter-arrival times.

6. The method of claim 1, wherein at least a portion of the multiple packets comprises the order number minus one.

7. The method of claim 1, further comprising:
   responsive to determining that the size of each of at least a portion of the multiple packets is not equal to the maximum segment size, returning a message indicating that the size of the initial congestion window is unknown.

8. A system for inferring an initial congestion window, comprising:
   a processor; and
   a memory storing instructions that, when executed by the processor, cause the processor to perform operations comprising:
      receiving a packet trace, the packet trace comprising arrival times for multiple packets;
      determining inter-arrival times between the multiple packets based on the arrival times;
      identifying an inter-arrival time in the inter-arrival times that is greater than a threshold;
      identifying an order number of the inter-arrival time;
      determining whether a size of each of at least a portion of the multiple packets is equal to a maximum segment size; and
      responsive to determining that the size of each of at least a portion of the multiple packets is equal to the maximum segment size, returning a size of the initial congestion window as a product of the order number and the maximum segment size.

9. The system of claim 8, wherein the packet trace comprises a unidirectional packet trace.

10. The system of claim 8, wherein determining the inter-arrival times between multiple packets in the packet trace comprises discarding a first chronological inter-arrival time from the multiple packets.

11. The system of claim 8, wherein identifying the inter-arrival time in the inter-arrival times that is greater than the threshold comprises:
   (a) selecting a first chronological inter-arrival time in the inter-arrival times as a current inter-arrival time;
   (b) determining whether the current inter-arrival time is greater than the threshold;
   (c) responsive to determining that the current inter-arrival time is greater than the threshold, identifying the inter-arrival time as the current inter-arrival time;
   (d) responsive to determining that the current inter-arrival time is not greater than the threshold, determining whether a last inter-arrival time in the inter-arrival times has been reached; and
   (e) responsive to determining that the last inter-arrival time has not been reached, incrementing the current inter-arrival time, and repeating (b)-(e) until a determination is made that the current inter-arrival time is greater than the threshold or until the last inter-arrival time has been reached.

12. The system of claim 11, wherein identifying the inter-arrival time in the inter-arrival times that is greater than the threshold further comprises:
   (f) responsive to determining that the last inter-arrival time has been reached, identifying the inter-arrival time as a largest inter-arrival time in the inter-arrival times.

13. The system of claim 8, wherein at least a portion of the multiple packets comprises the order number minus one.

14. A non-transitory computer-readable storage medium comprising instructions that, when executed by a processor, cause the processor to perform operations comprising:

receiving a packet trace, the packet trace comprising arrival times for multiple packets;

determining inter-arrival times between the multiple packets based on the arrival times;

identifying an inter-arrival time in the inter-arrival times that is greater than a threshold;

identifying an order number of the inter-arrival time;

determining whether a size of each of at least a portion of the multiple packets is equal to a maximum segment size; and responsive to determining that the size of each of at least a portion of the multiple packets is equal to the maximum segment size, returning a size of an initial congestion window as a product of the order number and the maximum segment size.

15. The non-transitory computer-readable storage medium of claim 14, wherein the packet trace comprises a unidirectional packet trace.

16. The non-transitory computer-readable medium of claim 14, wherein determining the inter-arrival times between multiple packets in the packet trace comprises discarding a first chronological inter-arrival time from the multiple packets.

17. The non-transitory computer-readable storage medium of claim 14, wherein identifying the inter-arrival time in the inter-arrival times that is greater than the threshold comprises:

(a) selecting a first chronological inter-arrival time in the inter-arrival times as a current inter-arrival time;

(b) determining whether the current inter-arrival time is greater than the threshold;

(c) responsive to determining that the current inter-arrival time is greater than the threshold, identifying the inter-arrival time as the current inter-arrival time;

(d) responsive to determining that the current inter-arrival time is not greater than the threshold, determining whether a last inter-arrival time in the inter-arrival times has been reached; and (e) responsive to determining that the last inter-arrival time has not been reached, incrementing the current inter-arrival time, and repeating (b)-(e) until a determination is made that the current inter-arrival time is greater than the threshold or until the last inter-arrival time has been reached.

18. The non-transitory computer-readable storage medium of claim 17, wherein identifying the inter-arrival time in the inter-arrival times that is greater than the threshold further comprises:

(f) responsive to determining that the last inter-arrival time has been reached, identifying the inter-arrival time as a largest inter-arrival time in the inter-arrival times.

19. The non-transitory computer-readable storage medium of claim 14, wherein at least a portion of the multiple packets comprises the order number minus one.

20. The non-transitory computer-readable storage medium of claim 14, wherein the instructions, when executed by the processor, cause the processor to perform further operations comprising:

responsive determining that the size of each of at least a portion of the multiple packets is not equal to the maximum segment size, returning a message indicating that the size of the initial congestion window is unknown.

\* \* \* \* \*